United States Patent
Sangameswaran et al.

(10) Patent No.: US 9,926,881 B2
(45) Date of Patent: Mar. 27, 2018

(54) STOP/START CONTROL FOR STOP/START VEHICLE IN TURN LANE

(71) Applicant: Ford Global Technologies, LLC, Dearborn, MI (US)

(72) Inventors: Sangeetha Sangameswaran, Canton, MI (US); Mathew Alan Boesch, Plymouth, MI (US); George Edmund Walley, Novi, MI (US); John Anthony Lockwood, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 1023 days.

(21) Appl. No.: 13/792,535

(22) Filed: Mar. 11, 2013

(65) Prior Publication Data

US 2014/0257677 A1  Sep. 11, 2014

(51) Int. Cl.
 *F02D 45/00* (2006.01)
 *F02N 11/08* (2006.01)

(52) U.S. Cl.
 CPC .......... *F02D 45/00* (2013.01); *F02N 11/0822* (2013.01); *F02N 11/0837* (2013.01); *F02N 2200/104* (2013.01); *F02N 2200/125* (2013.01); *Y02T 10/48* (2013.01)

(58) Field of Classification Search
 CPC .... F02D 41/0002; F02D 41/042; F02D 41/28; G07C 5/008; F02N 11/0807
 USPC .............. 701/112, 113, 51, 53, 65, 70, 123; 123/179.3, 179.4; 477/102
 See application file for complete search history.

(56) References Cited

U.S. PATENT DOCUMENTS

| | | | |
|---|---|---|---|
| 6,334,834 B1 * | 1/2002 | Mizutani et al. | 477/203 |
| 6,540,644 B2 * | 4/2003 | Morimoto et al. | 477/102 |
| 6,553,287 B1 | 4/2003 | Supina et al. | |
| 6,621,250 B1 | 9/2003 | Ohkubo et al. | |
| 6,675,094 B2 | 1/2004 | Russell et al. | |
| 6,830,534 B2 | 12/2004 | Seibertz et al. | |
| 6,941,218 B2 | 9/2005 | Wolf et al. | |
| RE40,164 E | 3/2008 | Kuang et al. | |
| 7,349,797 B2 | 3/2008 | Donnelly et al. | |
| 7,639,159 B2 * | 12/2009 | McNew et al. | 340/916 |
| 7,650,864 B2 | 1/2010 | Hassan et al. | |
| 7,698,053 B2 * | 4/2010 | Mori | 701/112 |
| 7,853,401 B2 * | 12/2010 | Hoetzer | 701/115 |
| 8,019,506 B2 | 9/2011 | Markiton et al. | |
| 8,095,291 B2 | 1/2012 | Christen et al. | |
| 8,170,737 B2 | 5/2012 | Tate, Jr. et al. | |
| 8,210,293 B2 | 7/2012 | Ang et al. | |
| 8,306,725 B2 | 11/2012 | Son et al. | |
| 8,392,066 B2 | 3/2013 | Ehara et al. | |

(Continued)

FOREIGN PATENT DOCUMENTS

| | | |
|---|---|---|
| DE | 3019709 A1 | 6/1980 |
| JP | 2004232557 A2 | 8/2004 |
| JP | 2006057456 A2 | 3/2006 |

*Primary Examiner* — Stephen K Cronin
*Assistant Examiner* — Susan Scharpf
(74) *Attorney, Agent, or Firm* — David B. Kelley; Brooks Kushman P.C.

(57) ABSTRACT

An engine of a stop/start vehicle, after the engine has been automatically stopped, may be commanded to automatically restart in response to detecting that the vehicle is in a turn lane based on traffic data in a vicinity of the vehicle such that the engine is automatically restarted before a brake pedal is released and a steering wheel is turned.

13 Claims, 3 Drawing Sheets

(56) References Cited

U.S. PATENT DOCUMENTS

| | | | |
|---|---|---|---|
| 8,532,843 B2 | 9/2013 | Nagura et al. | |
| 8,594,912 B2 | 11/2013 | Weaver | |
| 8,646,427 B2 | 2/2014 | Monnier et al. | |
| 8,904,984 B2 | 12/2014 | Hanft et al. | |
| 2002/0020575 A1* | 2/2002 | DeLuca et al. | 180/275 |
| 2005/0239436 A1 | 10/2005 | Bell et al. | |
| 2006/0277495 A1 | 12/2006 | Obradovich | |
| 2007/0078040 A1* | 4/2007 | Nobumoto et al. | 477/70 |
| 2009/0171547 A1* | 7/2009 | Hyde et al. | 701/102 |
| 2010/0125402 A1* | 5/2010 | Bansal et al. | 701/117 |
| 2010/0138098 A1 | 6/2010 | Takahara et al. | |
| 2010/0168992 A1 | 7/2010 | Nakata | |
| 2010/0280687 A1 | 11/2010 | Tate, Jr. et al. | |
| 2010/0286868 A1* | 11/2010 | Ehara et al. | 701/41 |
| 2011/0005486 A1 | 1/2011 | Nakamura | |
| 2012/0029730 A1* | 2/2012 | Nagura et al. | 701/2 |
| 2012/0330529 A1 | 12/2012 | Pebley et al. | |
| 2013/0199335 A1 | 8/2013 | Nedorezov et al. | |
| 2013/0255353 A1 | 10/2013 | Zawacki et al. | |
| 2014/0257678 A1 | 9/2014 | Boesch et al. | |

* cited by examiner

STOP/START CONTROL FOR STOP/START VEHICLE IN TURN LANE

TECHNICAL FIELD

This disclosure relates to stop/start vehicles and stop/start control logic for turn lane situations.

BACKGROUND

Stop/start vehicles may be equipped with an engine auto-stop feature. This feature shuts down the engine during certain periods of vehicle operation in order to conserve fuel. For example, the auto-stop feature may be engaged when the vehicle is stopped rather than permitting the engine to idle. The engine may be restarted when the driver releases the brake or actuates the accelerator.

SUMMARY

A method for controlling an engine of a stop/start vehicle including a brake pedal and a steering wheel includes, after the engine has been automatically stopped, commanding an automatic restart of the engine in response to detecting that the vehicle is in a turn lane based on traffic data in a vicinity of the vehicle such that the engine is automatically restarted before the brake pedal is released and the steering wheel is turned. The traffic data may comprise traffic light status or turn signal status.

A stop/start vehicle includes an engine, an accelerator pedal, a steering wheel, and a stop/start system. The stop/start system, in response to detecting that the vehicle is in a turn lane, commands an auto start of the engine prior to an actuation of the accelerator pedal and a rotation of the steering wheel. The stop/start system may further command the auto start based on traffic light status, turn signal status, data about another vehicle, or traffic conditions in a vicinity of the vehicle.

A method for controlling a stop/start vehicle including an engine, brake pedal, and steering wheel includes initiating an automatic restart of the engine in response to detecting that the vehicle is in a turn lane such that the engine is restarted prior to the brake pedal being released and the steering wheel being turned. The step of initiating is further performed based on traffic light status, turn signal status, data about another vehicle, or traffic conditions in a vicinity of the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start vehicles are powered by conventional internal combustion engines and equipped with a stop/start system controlling auto-stop and auto-start functions. The stop/start system may auto-stop the engine when the vehicle is stopped and the engine is not required for propulsion or other purposes. At a later time, the stop/start system may auto-start the engine when required for propulsion or other purposes. By disabling the engine when possible, overall fuel consumption is reduced. Unlike true hybrid vehicles, stop/start vehicles are not capable of pure electric propulsion. Furthermore unlike true hybrid vehicles, stop/start vehicles are not equipped with a traction battery. Rather they merely include a conventional starting, lighting, and ignition (SLI) battery.

Controllers may initiate an auto-stop or auto-start of the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, the controllers may issue a command to begin the process to start the engine, thus enabling the alternator or integrated starter generator to provide electric current to the electrical loads.

Figure 1:
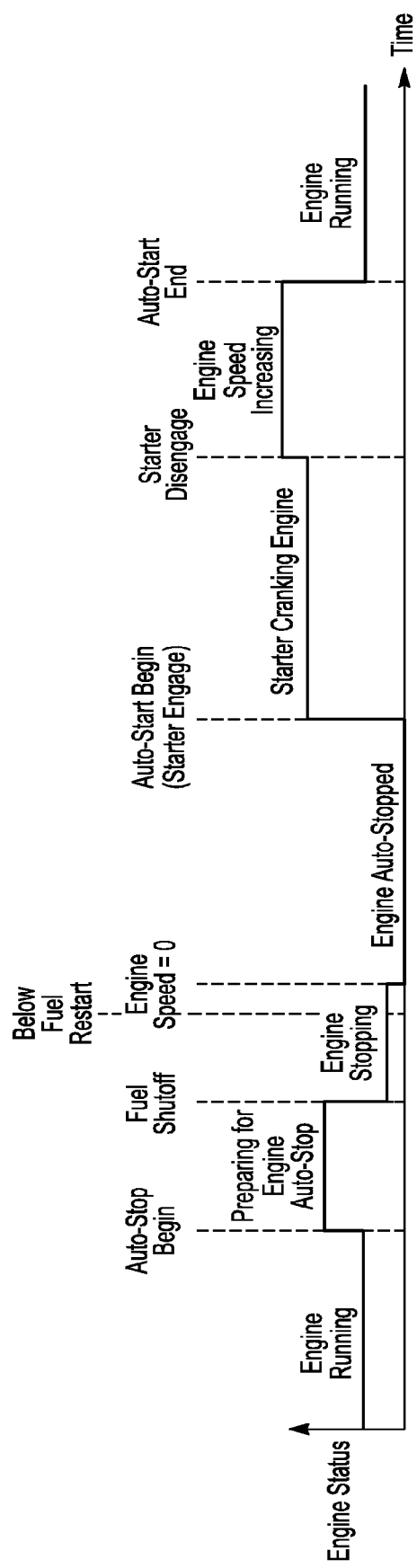
FIG. 1 is a plot illustrating engine status during an auto-stop.

With reference to FIG. 1, an engine stop/start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

When a stop start vehicle initiates auto-stop functionality, electric power assist steering is unavailable due to limited capabilities of the battery system. Power steering is only restored after the engine is restarted and the alternator is able to support the load. In some situations however, the driver may require power steering assist earlier than can be provided by an automatic engine restart. As an example, certain drivers may turn the steering wheel while the vehicle is still stopped in anticipation of a quick acceleration and turn: The steering wheel will be difficult to turn due to the unavailability of power steering assist. Certain systems and methods disclosed herein may enable the power steering assist in advance of a vehicle turn by anticipating a vehicle turning event while the vehicle is located in a turn lane.

One or more controllers may utilize inputs from a variety of sensors to reach a determination that the vehicle is in a turning lane. Once the controllers make a determination that the vehicle is in a turning lane, the controllers may determine whether a vehicle quick turn is anticipated. A quick turn is one in which the vehicle makes a turn immediately after beginning to accelerate from a stop. If the controllers make a determination that a quick turn is anticipated, then the controllers may command the stop/start system to auto-start the engine prior to the turn if the engine has already been automatically shut down, or to inhibit the auto-stop function if the engine has not been automatically shut down.

Figure 2:
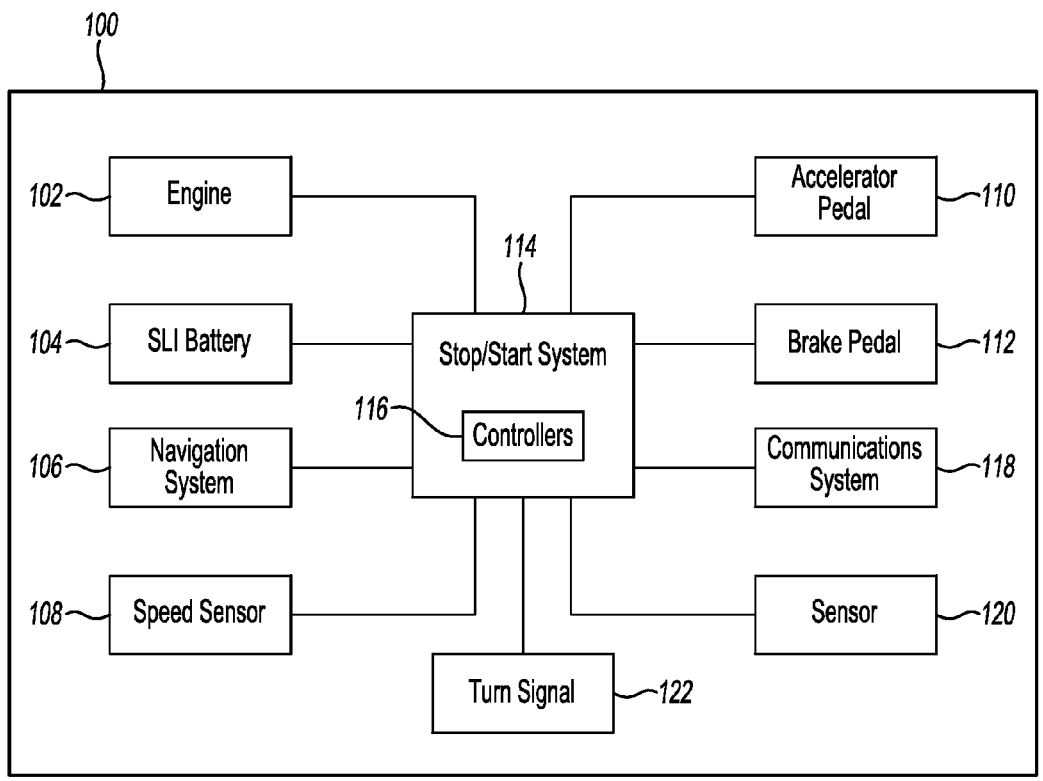
FIG. 2 is a block diagram of a stop/start vehicle.

With reference to FIG. 2, a schematic representation of a vehicle 100 having auto-stop functionality is shown. The vehicle 100 includes an engine 102, an SLI battery 104, a navigation system 106, a speed sensor 108, an accelerator pedal 110, a brake pedal 112, and a stop/start system 114 including at least one controller 116. The vehicle further includes a communications system 118, a sensor 120, and a turn signal 122. The engine 102, battery 104, navigation system 106, speed sensor 108, accelerator pedal 110, brake pedal 112, communications system 118, sensor 120, and turn signal 122 are all in communication with or under the control of the stop/start system 114, as indicated by solid line. In one configuration, the navigation system 106 may be a manufacturer-installed or aftermarket in-vehicle GPS system. In another configuration, the navigation system 106 may comprise a location-enabled mobile device such as a cellular phone or other standalone GPS unit. Other configurations are, of course, also possible. The communications system 118 may be configured to communicate with other vehicles having similar systems, with communications-enabled traffic signals, or with other devices. The sensor 120 may comprise an optical camera, radar, LiDAR, or other sensors known in the art.

The at least one controller 116 may issue auto-stop commands and auto-start commands to the engine 102 during vehicle operation. The stop/start system 114, for example, comprises a base auto-stop/start logic that issues auto-stop commands and auto-start commands—to achieve, among other things, stages similar to that described with reference to FIG. 1—based on signals from at least the speed sensor 108, accelerator pedal 110, and brake pedal 112. In short, the engine 102 will be shut down in response to an auto-stop command and will be restarted in response to an auto-start command.

Figure 3:
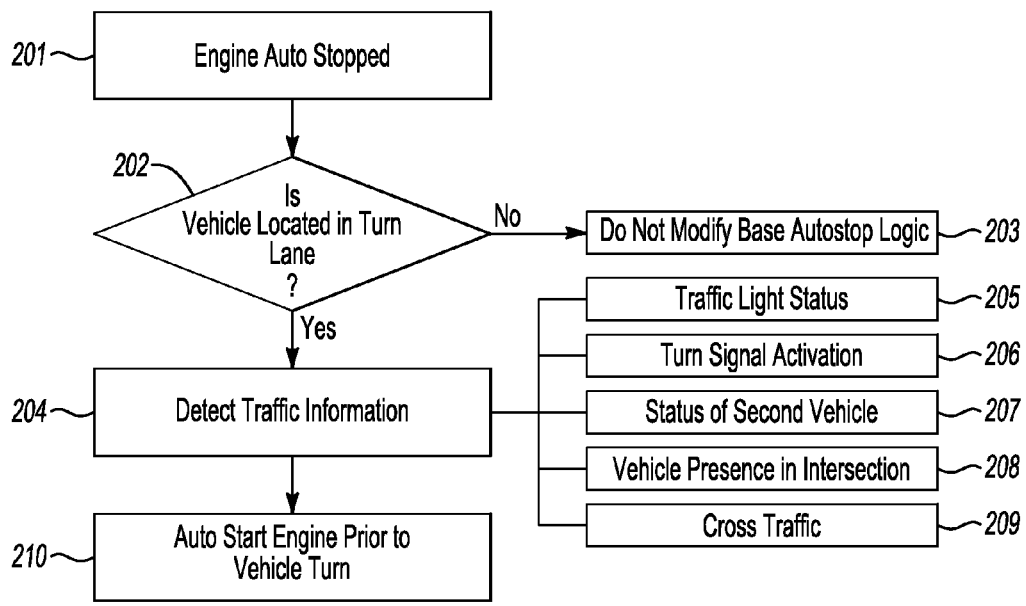
FIGS. 3 and 4 are flowcharts illustrating algorithms for controlling a start/stop vehicle.

With reference to FIGS. 2 and 3, a control algorithm is performed when the engine 102 has been auto-stopped, as illustrated in block 201. At block 202, it is determined whether the vehicle 100 is located in a turn lane, such as a right hand turn lane. This determination may be performed by the controllers 116 based on for example, a vehicle location detected by the navigation system 106. In embodiments wherein the sensor 120 comprises an optical camera, the determination may also be performed by optical recognition. The determination may also be performed based on other inputs as appropriate. If the determination is made that the vehicle 100 is not located in a turn lane, then the base stop/start logic is left unmodified, as illustrated in block 203. That is, the stop/start system 114 will control engine auto stops and auto starts based on vehicle speed and other relevant parameters following the processes described with reference to FIG. 1.

If the determination is made that the vehicle 100 is located in a turn lane, then traffic information is detected at block 204. The detected traffic information may be used by the controllers 116 to anticipate when a vehicle turn will occur. Detecting traffic information may comprise, for example, detecting a traffic light status as illustrated by block 205. If the intersection is controlled by a communications-enabled stoplight, then the communications system 118 may receive signals from the stoplight indicating the time until the light changes from red to green. The controllers 116 may anticipate that a vehicle turn will occur shortly after the light changes from red to green. Detecting traffic information may also comprise detecting a turn signal activation, as illustrated by block 206. If a turn signal is activated, then the controllers 116 may anticipate that a vehicle turn is imminent. Detecting traffic information may also comprise detecting a status of a second vehicle as illustrated by block 207. In embodiments wherein the sensor 120 comprises an optical camera, radar, or LiDAR, detecting a status of a second vehicle may include detecting a second vehicle positioned in front of the vehicle 100. If a second vehicle is detected at a position directly in front of the vehicle 100, then a quick turn event is unlikely because the vehicle 100 will probably pull further forward before the driver begins to turn. The communications system 118 may also enable detection of status of a second vehicle if the second vehicle is similarly equipped with a communications system. In such a configuration, detailed information regarding the status of the second vehicle may be detected, and the controllers 116 may anticipate a turn upon detecting that the second vehicle has auto started its engine or that the driver of the second vehicle has released the brake or actuated the accelerator pedal. Detecting traffic information may also comprise detecting a vehicle presence in an intersection, as illustrated by block 208. If the navigation system 106 indicates that the vehicle 100 is positioned in an intersection, as may occur when a driver pulls forward while waiting for a break in traffic, then the controllers 116 may anticipate that a turn is imminent. Detecting traffic information may also comprise detecting the presence or absence of cross traffic, as illustrated by block 209. This detection may be performed by the sensor 120. If the vehicle 100 is in a right turn lane and the sensor 120 detects an absence of cross traffic, then a quick turn event may be anticipated because the driver may turn right at a red light. This step may be further refined if stored map data indicates that the intersection is a "No Turn on Red" intersection, in which case a quick turn event is not anticipated regardless of cross traffic. Other traffic information may also be detected as appropriate.

The engine 102 is then automatically restarted prior to the vehicle turn, as illustrated in block 210. The controllers 116 may command the stop/start system 114 to restart the engine 102 as described above. In this way, power steering is enabled and available to the driver prior to turning the steering wheel and releasing the brake pedal (or actuating the accelerator pedal).

Figure 4:
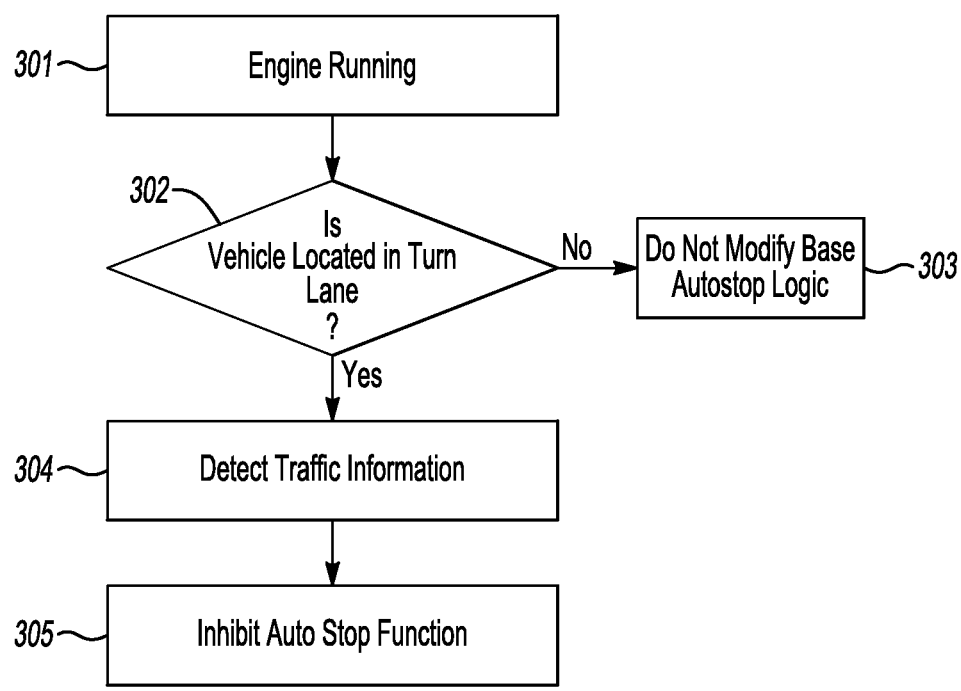

With reference to FIGS. 2 and 4, a control algorithm is performed when the engine 102 has not been auto stopped, as illustrated in block 301. At block 302, it is determined whether the vehicle 100 is located in a turn lane. This determination may be made based on similar inputs as described with reference to FIG. 3. If the determination is made that the vehicle 100 is not located in a turn lane, then the base stop/start logic is left unmodified, as illustrated by block 303. If the determination is made that the vehicle 100 is located in a turn lane, traffic data is detected as illustrated by block 304. The engine auto-stop function is then inhibited as illustrated by block 305. The controllers 116 may command the stop/start system 114 to inhibit the auto stop function. In this way, power steering is enabled (because the engine remains running) and available to the driver prior to initiating the quick turn.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling an engine of a stop/start vehicle including a brake pedal and a steering wheel, the method comprising:
   after the engine has been automatically stopped, commanding an automatic restart of the engine in response to detecting that the vehicle is in a turn lane based on traffic data in a vicinity of the vehicle such that the engine is automatically restarted before the brake pedal is released and the steering wheel is turned.

2. The method of claim 1 wherein the traffic data comprises traffic light status.

3. The method of claim 1 wherein the traffic data comprises turn signal status.

4. A stop/start vehicle comprising:
   an engine;
   an accelerator pedal;
   a steering wheel; and
   a stop/start system programmed to, in response to detecting that the vehicle is in a turn lane, command an auto start of the engine prior to an actuation of the accelerator pedal and a rotation of the steering wheel.

5. The vehicle of claim 4 wherein the stop/start system is further programmed to command the auto start based on traffic light status.

6. The vehicle of claim 4 wherein the stop/start system is further programmed to command the auto start based on turn signal status.

7. The vehicle of claim 4 wherein the stop/start system is further programmed to command the auto start based on data about another vehicle.

8. The vehicle of claim 4 wherein the stop/start system is further programmed to command the auto start based on traffic conditions in a vicinity of the vehicle.

9. A method for controlling a stop/start vehicle including an engine, brake pedal, and steering wheel, the method comprising:
   initiating an automatic restart of the engine in response to detecting that the vehicle is in a turn lane such that the engine is restarted prior to the brake pedal being released and the steering wheel being turned.

10. The method of claim 9 wherein the step of initiating is further performed based on traffic light status.

11. The method of claim 9 wherein the step of initiating is further performed based on turn signal status.

12. The method of claim 9 wherein the step of initiating is further performed based on data about another vehicle.

13. The method of claim 9 wherein the step of initiating is further performed based on traffic conditions in a vicinity of the vehicle.

* * * * *